US012810340B2

(12) United States Patent
Ali et al.

(10) Patent No.: US 12,810,340 B2
(45) Date of Patent: Nov. 24, 2026

(54) TECHNIQUES FOR ENHANCING THE RELEVANCY OF CANDIDATE ITEM SELECTIONS PRESENTED AT A SELF-CHECKOUT

(71) Applicant: NCR Voyix Corporation, Atlanta, GA (US)

(72) Inventors: Sarfaraz Ali, Hyderabad (IN); Faiz Ahmed, Hyderabad (IN); Mohammed Fayaz Ahmed, Hyderabad (IN)

(73) Assignee: NCR Voyix Corporation, Atlanta, GA (US)

( * ) Notice: Subject to any disclaimer, the term of this patent is extended or adjusted under 35 U.S.C. 154(b) by 74 days.

(21) Appl. No.: 18/791,422

(22) Filed: Jul. 31, 2024

(65) Prior Publication Data

US 2026/0038022 A1 Feb. 5, 2026

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 10,366,442 | B1 * | 7/2019 | Oczkowski | G06Q 30/0633 |
| 2015/0154660 | A1 * | 6/2015 | Weald | G06Q 30/0277 705/14.73 |
| 2021/0166283 | A1 * | 6/2021 | Black | G06Q 30/0631 |
| 2021/0319492 | A1 * | 10/2021 | Jeong | G06Q 30/0643 |
| 2023/0098811 | A1 * | 3/2023 | Shevtsov | G06Q 20/206 705/16 |
| 2023/0100172 | A1 * | 3/2023 | Crompton | G06Q 20/203 705/22 |
| 2024/0005750 | A1 * | 1/2024 | Schoch | G06Q 20/18 |

* cited by examiner

*Primary Examiner* — Abby J Flynn
(74) *Attorney, Agent, or Firm* — Schwegman Lundberg & Woessner, P.A.

(57) ABSTRACT

A picklist of candidate predicted items for a non-barcoded item being purchased at a self-checkout terminal is enhanced to include other candidate predicted items that are visually indistinguishable from the candidate predicted items. An organic produce item PLU is included in the picklist for each non-organic PLU in the picklist. The organic produce item PLUs are ordered adjacent to the corresponding non-organic item PLUs to improve the consumer browsing experience and increase the likelihood that organic item purchases are accurately captured. Consumer selections from the picklist are returned to a machine learning model as feedback data to enable continuous learning and improved model accuracy. Non-organic produce item PLUs are returned for selections of organic produce items, thereby resulting in improved confidence values for non-organic PLUs and increased prediction accuracy of the model, while still ensuring organic items are included in the picklist and without requiring lowering of a confidence threshold.

17 Claims, 3 Drawing Sheets

TECHNIQUES FOR ENHANCING THE RELEVANCY OF CANDIDATE ITEM SELECTIONS PRESENTED AT A SELF-CHECKOUT

BACKGROUND

Consumer self-checkout adoption has accelerated in recent years due to a variety of factors. Among these are the COVID-19 pandemic and the associated concerns of disease transmission surrounding cashier-assisted transactions, labor shortages which were exacerbated by the pandemic and have persisted since, and so forth. Aside from the pandemic-related reasons noted above, many consumers prefer self-checkout because they view it as a more efficient way to complete their transaction, particularly if they have a limited number of items to purchase or the lines for cashier-assisted lanes are long.

One such technology involves capturing, at a self-checkout transaction terminal, images of an item such as a produce item, comparing the captured images to reference item images to identify candidate predicted items for the item, and presenting, on a display of the transaction terminal, the candidate items as selectable options. In particular, in the case of a produce item for example, a consumer can select an image of the candidate produce item that matches the produce item being purchased to automatically add the item to the transaction record, without having to key in a product lookup (PLU) code or enter in a text description of the item, thereby reducing the total transaction time and improving the user experience.

DETAILED DESCRIPTION

Figure 1:
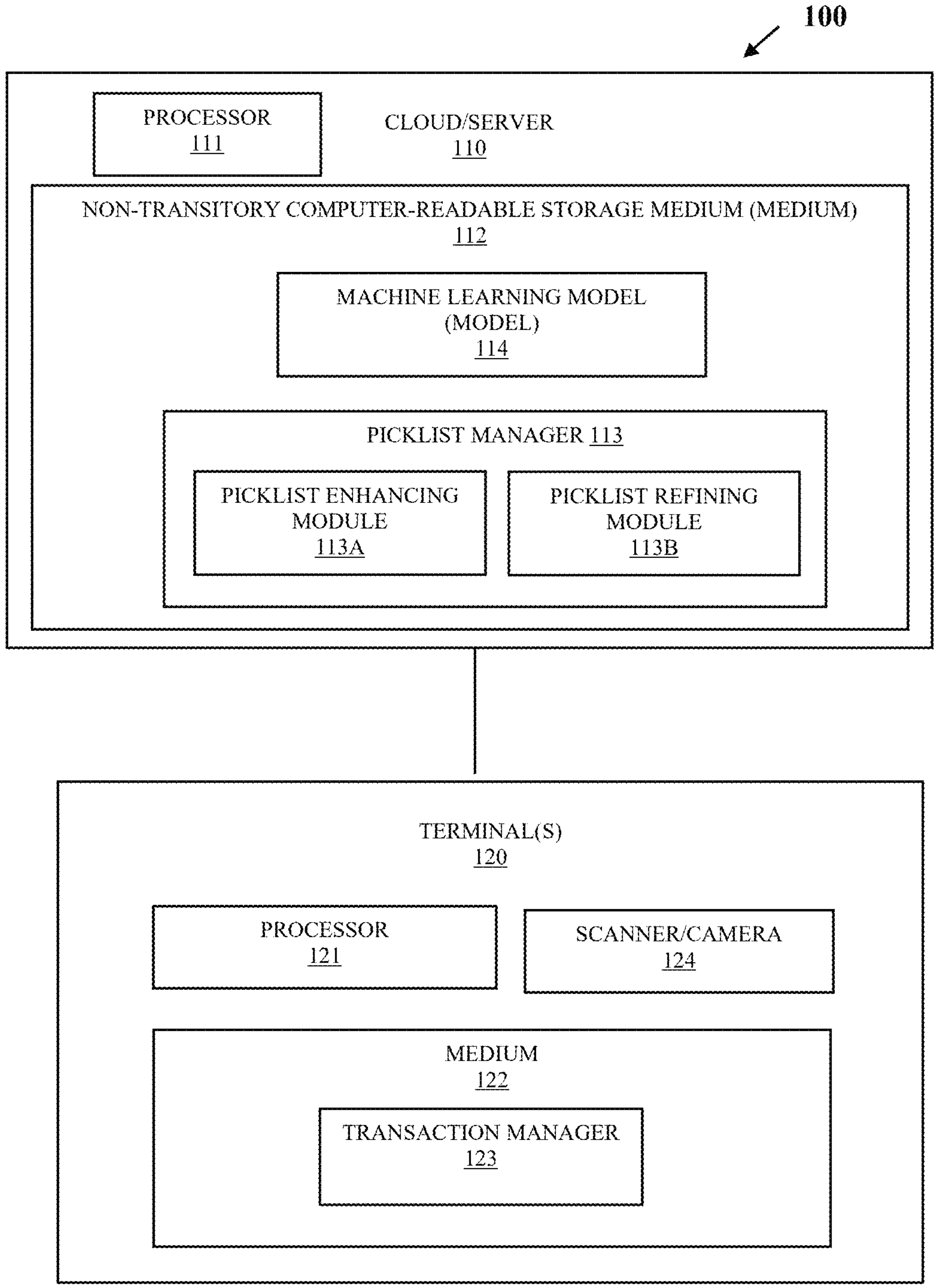
FIG. 1 is a diagram of a system for enhancing the relevancy of candidate predicted item selections presented at a self-checkout, according to an example embodiment.

Consumers utilize self-checkout for a variety of reasons, including to experience a more efficient checkout process, to avoid contact with cashiers to, for example, mitigate the risk of disease transmission, and so forth. Various self-checkout technologies have been developed to enhance the efficiency of the self-checkout process and make it more frictionless for the consumer. One such technology involves capturing, at a self-checkout transaction terminal, one or more images of an item, identifying candidate predicted items for the item based on a comparison of the captured images to reference images stored in a database, and presenting, at the transaction terminal, the candidate predicted items as options selectable by the consumer to add to the transaction record. The candidate predicted items may be presented as a series of user-selectable thumbnail images of the candidate predicted items along with corresponding names/textual descriptions of the items (referred to at times hereinafter as a "picklist"). A consumer can then select the candidate item from the picklist (e.g., select the image) that matches the item being purchased, in response to which, the selected item is added to the transaction record.

In the case of produce items-which often do not have scannable barcodes affixed thereto-a consumer, in the absence of the picklist technology described above, would likely need to key in a product lookup (PLU) code or enter in a text description of the item (e.g., cucumber) in order for the item to be identified and added to the transaction record. In particular, the picklist technology streamlines the self-checkout process by predicting which produce item has been placed on a surface of the self-checkout terminal (e.g., a scale surface)—based on a comparison of captured images of the item to reference images—and presenting a selectable picklist of candidate predicted items from which the consumer can select the correct item, via touch input provided to a display of the self-checkout terminal, for example.

The picklist technology described above can be implemented using a machine learning model that receives image (s) as input (e.g., images of a produce item) and outputs a set of candidate predicted items along with corresponding confidence values that indicate the likelihood that the predicted items are the item in the input image(s). More specifically, the machine learning model's output may take the form of a listing of PLUs for the predicted item along with the corresponding confidence values. The terms "PLU" and "PLU code" are used interchangeably herein. The machine learning model may be trained on ground truth data that includes a set of reference images of produce items. A consumer's selection of a particular suggested item from the picklist can be provided back to the machine learning model as feedback data. In this manner, the model can be continuously re-trained and refined based on the consumer's selections. In particular, the confidence value associated with a consumer's selection of an item from the picklist may be increased the next time the model sees an input image of a similar produce item, while the confidence values associated with the non-selected picklist items may be correspondingly lowered. While various embodiments may be described herein in the context of produce items, it should be appreciated that such embodiments are also applicable to other non-barcoded items such as certain bakery goods, deli items, etc.

The order in which candidate predicted items are presented in the picklist may be determined by the confidence values/levels/scores associated with the predictions. More specifically, the candidate predicted items may be presented in descending order of their corresponding confidence values, i.e., the first candidate predicted item displayed in the picklist may be that item which has the highest associated confidence value among all the predicted items, indicating the greatest likelihood that that predicted item is in fact the item being purchased; the second candidate predicted item displayed in the picklist may be the item having the second highest confidence value; and so on.

As a non-limiting example, consider a use case in which a consumer places a tomato on a scanner/scale surface of a self-checkout apparatus. One or more images of the tomato are captured and fed to a machine learning model. An example output of the machine learning model may be as follows: {"confidence": 0.91, "code": "3151"}, {"confidence": 0.05, "code": "4087"}, where "3151" is the PLU for tomatoes on the vine and "4087" is the PLU for Roma tomatoes. In this example, indicia (e.g., a thumbnail image) of tomatoes on the vine would be presented first in the picklist as it has the highest associated confidence value, and indicia of a Roma tomato would be presented second, as it has a lower confidence value.

In some cases, a configurable confidence threshold parameter may be set such that candidate predicted items having associated confidence values that fail to satisfy the confidence threshold are excluded from the picklist. Depending on the implementation, failing to satisfy the confidence threshold may require that the confidence value is strictly less than the threshold or that the confidence is less than or equal to the confidence threshold. In other embodiments, For instance, consider the following example machine learning model output: {“confidence”: 0.461515324224286, “code”: “4012”}, {“confidence”: 0.1598017378462506, “code”: “4450”}, {“confidence”: 0.07851231070726357, “code”: “3156”}, {“confidence”: 0.07333649382544838, “code”: “3121”}, {“confidence”: 0.04261589293133731, “code”: “3386”}, {“confidence”: 0.017147530579150402, “code”: “4053”}. If we assume a confidence threshold of 0.05, for example, then the last two PLUs above would not meet the threshold and would be excluded from the picklist. More specifically, after application of the confidence threshold, the picklist presented to the consumer would include the first four PLUs above in descending order of their corresponding confidence values, i.e., 4012, 4450, 3156, 3121.

While picklist technology can streamline the process via which produce items (or other non-barcoded items) are added to the transaction record, it can also present various technical challenges such as when confronted with produce items that are visually identical or otherwise difficult to visually distinguish (referred to hereinafter as “visually indistinguishable”). A retailer may assign different PLUs to visually indistinguishable produce items to account for the difference in price between the items, for example. Examples of visually indistinguishable items that may be assigned different PLUs include organic vs. non-organic produce (e.g., an organic banana vs. a non-organic banana); items of different sizes (e.g., a small Gala apple vs. a large Gala apple); items from different sources (e.g., Hawaiian bananas vs. Mexican bananas). In some cases, retailers may affixed labels, markings, or the like to distinguish otherwise visually indistinguishable produce items (e.g., place a sticker of a particular color on organic bananas to help distinguish them from non-organic bananas). This practice, however, is rare as it can be costly, time-consuming, and prone to error.

A machine learning model trained to output, based on input images of a produce item, candidate predicted items and associated confidence values indicating a likelihood that the predicted items match the produce item may have difficulty providing correct predictions in situations involving visually indistinguishable produce. This may be the case even if the model is trained to generate predictions with a high level of accuracy.

Failure to provide accurate predictions, however, can have a negative business impact on retailers. For instance, retailers would tend to lose income if the model always recommends non-organic bananas over organic ones. Conversely, consumers would tend to overpay if the model always recommends organic bananas or non-organic ones. Another adverse consequence of failure to provide accurate predictions in the case of visually indistinguishable produce is that retailers receiving misleading data on consumer purchase behavior. Yet another adverse consequence would be that even if a consumer (a customer of a retailer) recognizes that the picklist does not suggest the correct produce item and manually searches for the correct item, the consumer's experience is degraded. For example, assume that a consumer is purchasing organic green beans, notices that the picklist includes non-organic green beans, but not organic green beans, and searches for and selects organic green beans. In this case, accurate transaction data is being captured, but at the expense of the consumer experience.

Taking organic vs. non-organic produce as an example, a picklist-generating machine learning model may assign a lower confidence value to the organic produce than the non-organic produce because the organic produce tends to be sold less often. To counter this effect and increase the likelihood that the organic version of a produce item is presented in the picklist, the confidence threshold can be lowered. This, however, produces the undesirable consequence that other low confidence non-organic produce would now meet the lowered confidence threshold and appear in the picklist.

For example, organic bananas may be sold less often than non-organic bananas, and thus, may have a lower associated confidence value. This lower confidence value may be further exacerbated by the organic banana not being presented in the picklist, and by virtue of this, being less likely to be selected even when an organic banana is actually being purchased. Now, assume that the confidence threshold is lowered such that organic bananas now satisfy the confidence threshold to be included in the picklist. While organic bananas now make the list, other non-organic produce with low confidence values (e.g., yellow squash) will also now satisfy the threshold and be included in the picklist, which degrades the quality and accuracy of the picklist suggestions.

The teachings provided herein offer a technical solution to the aforementioned technical problems associated with providing item predictions for visually indistinguishable produce. In accordance with embodiments of the disclosed technology, a machine learning model (hereinafter “model” and/or “MLM”) is configured to output, for each non-organic produce item that meets the confidence threshold, the corresponding organic equivalent, regardless of whether the organic equivalent itself meets the confidence threshold. Further, in accordance with embodiments of the disclosed technology, because organic versions of non-organic produce items are always returned in the picklist, even if a consumer selects an organic version of a produce item from the picklist, the PLU corresponding to the non-organic version is returned back to the machine learning model so that the model can learn from the feedback data and improve the accuracy of its predictions.

Embodiments of the technology disclosed herein, as described above and in further detail hereinafter, offer a technical solution to the technical problems associated with existing models for providing predictions for visually indistinguishable produce items. In particular, by also providing, in the picklist output, the organic equivalent of each non-organic item in the picklist output, it is more likely that a consumer selects an organic produce item when they are in fact purchasing the organic produce item, thereby ensuring that retailers are not losing profit on organic produce sales. Moreover, in certain embodiments, the organic version of a produce item is presented adjacent to the non-organic equivalent, further increasing the likelihood that a consumer correctly selects the organic item when warranted. Further, since the organic equivalents are presented in the picklist without having to lower the confidence threshold, the technical solution presented herein results in stronger confidence levels for all PLUS, organic and non-organic alike. These overall stronger confidence levels further produce the technical effect of presenting more accurate produce items among the picklist suggestions. For example, the stronger overall confidence levels would result in yellow squash being less likely to be suggested in a picklist output based on an image of a banana. In addition, in example embodiments, the organic item PLU may be presented in proximity to the non-organic equivalent PLU (e.g., immediately preceding or proceeding), ensuring that similar items are grouped and presented together in the picklist, thereby improving the browsing experience for consumers.

Still further, in some embodiments, a retailer may be able to customize the ordering of items in the picklist based on business rules or to align with specific sales targets or promotional campaigns. For instance, by presenting items in a strategically optimized order, the visibility of key products can be enhanced, potentially leading to increased sales conversion rates. In particular, items that are strategically positioned at the beginning or end of the picklist (e.g., an organic item PLU), can lead to increased sales of that item (e.g., increased ability to capture organic item purchases).

FIG. 1 is a diagram of a system 100 in accordance with example embodiments of the disclosed technology. It is to be noted that the components are shown schematically in greatly simplified form, with only those components relevant to understanding of the embodiments being illustrated. Furthermore, the various components illustrated in FIG. 1 and their arrangement is presented for purposes of illustration only. It is to be noted that other arrangements with more or less components are possible without departing from the teachings presented herein and below.

The system includes a cloud 110 or a server 110 (hereinafter "cloud 110") and a plurality of terminals 120. Cloud 110 includes a processor 111 and a non-transitory computer-readable storage medium (hereinafter "medium") 112, which includes executable instructions for a picklist manager 113 and one or more machine learning models (model) 114. Medium 112 further includes executable instructions for a picklist enhancing module 113A and a picklist refining module 113B. While the picklist enhancing module 113A and the picklist refining module 113B are depicted in FIG. 1 as forming part of the picklist manager 113, it should be appreciated that one or both of the picklist enhancing module 113A and the picklist refining module 113B may be provided separately from the picklist manager 113, including as part of the model 114, as part of the transaction manager 123, or as standalone modules executable on the cloud/server 110 and/or one or more transaction terminals 120. Further, it should be appreciated that either of the modules 113A, 113B, or in fact any other software component depicted in FIG. 1 can be implemented using any suitable architecture, including as multiple distributed modules, as a containerized set of microservices, or the like.

Each terminal 120 includes a processor 121 and medium 112, which includes executable instructions for a transaction manager 123. Each terminal 120 further includes a scanner/camera 124 to capture at least one image of an item (e.g., a non-barcoded item such as a produce item) during a transaction at the corresponding terminal 120.

Initially, model 114 is trained on a training dataset that includes images of various non-barcoded items. While embodiments of the disclosed technology may be described herein through reference to produce items specifically, it should be appreciated that such embodiments can be expanded to and are applicable to any non-barcoded item. Each image is labeled with an indication of the corresponding produce item depicted in the image. For example, each image may be labeled with the PLU of the produce item depicted in the image. The images are obtained from cameras 124. In some embodiments, the training dataset may include multiple images of a particular produce item, captured by different cameras 120 at different angles. The cameras 124 may be integrated with a weigh scale of the terminal 120 and may capture the images upon placement of the produce item on the scale. Alternatively, the cameras 124 may be external to the scale (e.g., provided overhead).

Following training, model 114 may be tested on additional images depicting produce items at terminals 120 until an acceptable or predefined accuracy metric is achieved by the model 114. In an example embodiment, a transaction workflow for transactions at terminals 120 is enhanced to provide images of produce items as training data to the model 114 when operators of terminals 120 enter or select a price lookup (PLU) code corresponding to a produce item. For example, cameras 124 capture the images of the produce items while the produce items are on scales of the terminals 120 and the images are made accessible to picklist manager 113 via a network storage location and/or sent by transaction manager 123 to picklist manager 113.

For each transaction, picklist manager 113 provides one or more images of the produce item as input to model 114. Model 114 compares the received image(s) to reference images on which the model 114 was trained and returns as output a set of PLUs corresponding to candidate predicted items for the produce item as well as their corresponding confidence values (referred to herein as a picklist). In example embodiments, the picklist is sorted in descending order of confidence value such that the highest confidence PLU appears first in the picklist and the lowest confidence PLU appears last in the picklist.

In some embodiments, a configurable confidence threshold may be set such that PLUs having corresponding confidence values that fall below the confidence threshold are discarded/excluded from the picklist. In some embodiments, the model 114 itself may be configured to discard/exclude PLUs with confidence values below the threshold prior to providing the picklist output to the picklist manager 113. In other embodiments, the model 114 may provide a picklist output to the picklist manager 113 that includes PLUs with confidence values below the threshold, and the picklist manager 113 may be configured to iterate through the picklist and discard/exclude those PLUs having confidence values below the threshold.

Figure 2:
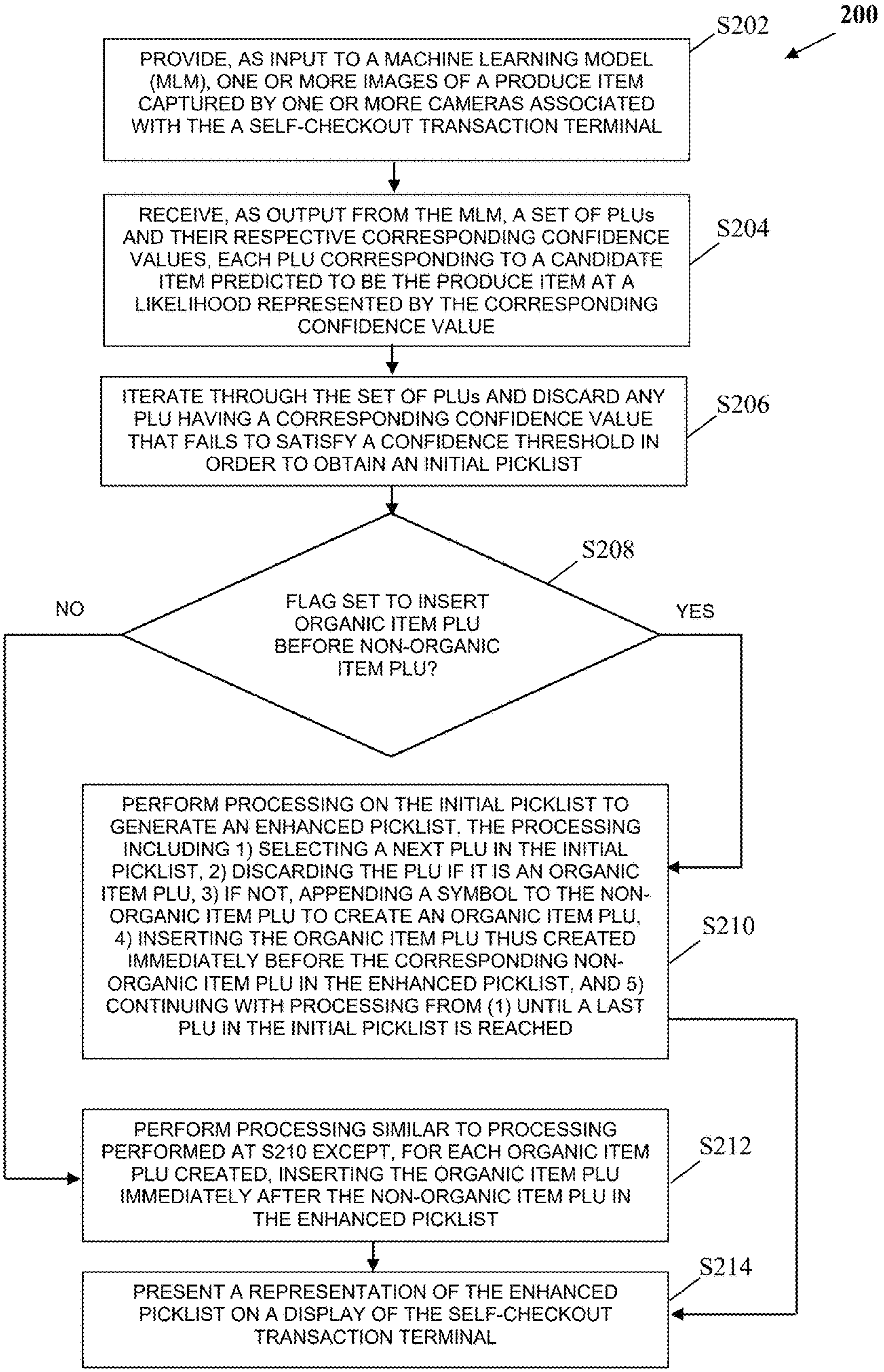
FIG. 2 is a flow diagram of a method for enhancing the relevancy of candidate predicted item selections presented at a self-checkout, according to an example embodiment.

In example embodiments, the picklist enhancing module 113A may be configured to enhance the picklist containing the PLUs with confidence values that meet the threshold by performing at least a portion of the processing depicted in FIG. 2 and described in more detail hereinafter. In particular, the picklist enhancing module 113 may be configured to iterate through the picklist, discard any existing organic item PLUs in the picklist, create a new organic item PLU for each non-organic item PLU in the picklist by appending a symbol to the non-organic item PLU, and insert any organic item PLU so created into the picklist at a position adjacent (either immediately preceding or immediately proceeding) to the corresponding non-organic item PLU, in order to create an enhanced picklist. Whether the organic item PLU is inserted before or after the corresponding non-organic item PLU while generating the enhanced picklist may be determined by whether a flag/parameter is set or not. Picklist manager 113 may then provide the enhanced picklist to transaction manager 123, for presentation on a display of the terminal 120.

The enhanced picklist may be presented at the terminal 120 in the form of a series of thumbnail images depicting the candidate predicted items whose corresponding PLUs are contained in the enhanced picklist, where the thumbnail images are ordered based on the order of the PLUs in the enhanced picklist, and where each image is indicative of a corresponding PLU in the enhanced picklist-either a non-organic item PLU also present in the initial picklist or an organic item PLU inserted into the initial picklist to create the enhanced picklist. It should be appreciated that the enhanced picklist may be presented using alternative representations.

In example embodiments, the picklist refining module 113B may be configured to receive, at the terminal 120, input indicative of a consumer selection of a particular candidate predicted item from the enhanced picklist. If the selected item is a non-organic item, the picklist refining module 113B may return the corresponding PLU for the non-organic item to the model 114 as feedback data for additional learning. If the selected item is an organic item, rather than returning the PLU for the organic item, the picklist refining module 113B may return the PLU for the non-organic equivalent to the model 114 as feedback data. This yields the technical benefit of reinforcing the predictive capacity of the model 114 with respect to non-organic item PLUs by enhancing their corresponding confidence values (because organic item selections by the consumer are captured as non-organic item selections for the purposes of additional learning by the model 114). At the same time, organic item PLUs continue to be presented as picklist options to the consumer, thereby ensuring that organic item sales are properly captured and mitigating the risk of lost profits to retailers for such sales.

It should be appreciated that the symbol that is appended to the non-organic item PLU to create the organic item PLU may be a numeric digit (e.g., the numeral '9'), another alphanumeric symbol, or any other suitable symbol. The symbol may be appended to the beginning, the end, or anywhere within the non-organic item PLU. In addition, it should be appreciated that the embodiments described herein in relation to produce items can be extended to any other situations involving visually indistinguishable items (e.g., items of the same type but different sizes, items that are visually indistinguishable but include different ingredients such as an item and its gluten-free alternative, etc.). Different symbols can be used for the different situations. For example, symbol A may be used to create an organic item PLU from a non-organic item PLU, symbol B may be used to generate a PLU to represent the same item type as an existing PLU but in a different size, and symbol C may be used to create a gluten free item PLU from the PLU corresponding to the regular item.

In an embodiment, terminal 120 is a self-service terminal (SST) that performs self-service transactions of customers who are the operators of the terminal 120. In an embodiment, terminal 120 is a point-of-sale (POS) terminal that performs cashier-assisted transactions for customers and which is operated by a cashier.

The above-referenced embodiments and other embodiments are now discussed with reference to FIGS. 2 and 3. FIG. 2 is a flow diagram of a method 200 for enhancing the relevancy of candidate predicted item selections presented at a self-checkout, according to an example embodiment. The method 200 may be performed, at least in part, by the picklist enhancing module 113A. The picklist enhancing module 113A may be implemented as executable instructions programmed and residing within memory and/or a non-transitory computer-readable (processor-readable) storage medium and executed by one or more processors of one or more devices. The processor(s) of the device(s) that execute the picklist enhancing module 113A may be specifically configured and programmed to process the picklist enhancing module 113A. The picklist enhancing module 113A may have access to one or more network connections to enable, at least in part, its processing. The connections can be wired, wireless, or a combination thereof.

In an embodiment, the device that executes the picklist enhancing module 113A is cloud 110 or server 110. In an embodiment, server 110 is a server of a given retailer that manages multiple stores, each store having a plurality of terminals 120. In an embodiment, terminal 120 is an SST or a POS terminal. In an embodiment, the picklist enhancing module 113A is some, all, or any combination of, picklist manager 113 and/or model 114. In am embodiment, the picklist enhancing module 113A may be executed, at least in part, on a terminal 120.

In an embodiment, at step S202, one or more images of a produce item presented at a self-checkout transaction terminal are captured by one or more cameras associated with the terminal. The captured image(s) are then provided as input to a trained machine learning model (MLM).

In an embodiment, at step S204, output is received from the MLM. The output takes the form of a set of PLU codes along with respective corresponding confidence values for the PLU codes. Each PLU code corresponds to a candidate item predicted to be the produce item at a likelihood represented by the corresponding confidence value.

In an embodiment, at step S206, the set of PLU codes is iterated through to discard any PLU having a corresponding confidence value that fails to satisfy a confidence threshold. In this manner, an initial picklist of candidate predicted items is created. In some embodiments, the processing at step S206 may be performed by the MLM and the output from the MLM may be the initial picklist having only PLU codes that satisfy the confidence threshold.

In an embodiment, at step S208, a check is performed to determine whether a flag, parameter, or the like is set to insert an organic produce item PLU code before its corresponding non-organic produce item PLU code. If the flag is determined to be set at step S208, then the method 200 proceeds to step S210, where processing is performed on the initial picklist to generate an enhanced picklist. The processing includes iterating through the PLU codes of the initial picklist, discarding each organic item PLU code that is encountered (if any), and for each non-organic item PLU code that is encountered, appending a symbol to the non-organic item PLU code to generate an organic item PLU code and inserted the generated organic item PLU code into the picklist immediately before the corresponding non-organic PLU code. This processing is performed until each PLU code in the initial picklist has been iterated through.

Alternatively, if a negative determination is made at step S208, the method 200 proceeds to step S212, where processing similar to that performed at step S210 is performed, except that any organic item PLU code that is generated is inserted into the picklist immediately after the corresponding non-organic item PLU code. It should be appreciated that the flag that is checked at step S208 could in alternative embodiments indicate, when set, that an organic item PLU code is to be inserted after the corresponding non-organic item PLU code. Moreover, in some embodiments, the organic item PLU code does not need to be inserted immediately adjacent the corresponding non-organic item PLU code, but can be inserted anywhere in the picklist in accordance with a retailer's business rules or sales objectives.

In an embodiment, at step S214, a representation of the enhanced picklist is presented to a consumer at the self-checkout transaction terminal. The representation may be a series of thumbnail images of the candidate predicted items corresponding to the PLU codes in the enhanced picklist. The images may be ordered in the same order that the PLU codes appear in the enhanced picklist. The images may be selectable by an operator of the terminal (e.g., a consumer). Selection of a a particular image corresponding to a particular candidate predicted item indicates that that item matches the item being purchased, and results in the selected item being added to the transaction record.

Figure 3:
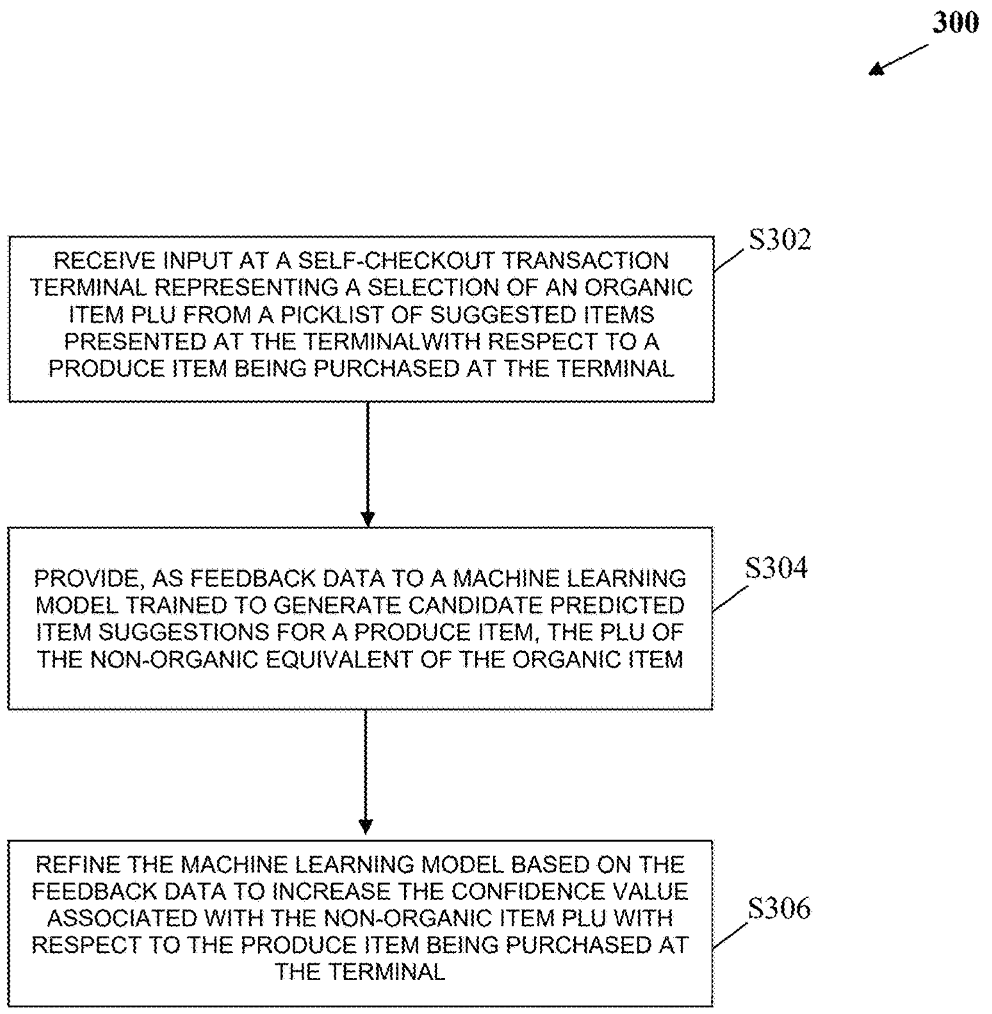
FIG. 3 is a flow diagram of a method for continuous learning of a machine learning model to generate candidate item predictions having enhanced relevancy, according to an example embodiment.

FIG. 3 is a flow diagram of a method 300 for continuous learning of a machine learning model to generate candidate item predictions having enhanced relevancy, according to an example embodiment. The method 300 may be performed, at least in part, by the picklist refining module 113B. The picklist refining module 113B may be implemented as executable instructions programmed and residing within memory and/or a non-transitory computer-readable (processor-readable) storage medium and executed by one or more processors of one or more devices. The processor(s) of the device(s) that execute the picklist refining module 113B may be specifically configured and programmed to process the picklist refining module 113B. The picklist refining module 113B may have access to one or more network connections to enable, at least in part, its processing. The connections can be wired, wireless, or a combination thereof.

In an embodiment, the device that executes the picklist refining module 113B is cloud 110 or server 110. In an embodiment, server 110 is a server of a given retailer that manages multiple stores, each store having a plurality of terminals 120. In an embodiment, terminal 120 is an SST or a POS terminal. In an embodiment, the picklist refining module 113B is some, all, or any combination of, picklist manager 113 and/or model 114. In an embodiment, the picklist refining module 113B may be executed, at least in part, on a terminal 120.

The method 300 assumes that the method 200 has been performed and a representation of the enhanced picklist has been presented on the self-checkout transaction terminal. In an embodiment, at step S302, input is received at the transaction terminal, the input representing a selection by a consumer of an organic item PLU code from an enhanced picklist of suggested items (i.e., candidate predicted items) presented at the terminal.

In an embodiment, at step S304, the PLU code corresponding to the non-organic equivalent of the organic item that was selected is sent to the MLM as feedback data. That is, rather than sending the PLU code corresponding to the organic item that was selected, the PLU code of the non-organic item is sent instead.

Then, in an embodiment, at step S306, the MLM learns based on the feedback data and is refined to increase the confidence value corresponding to the non-organic item PLU code with respect to the produce item being purchased at the terminal. The organic item PLU code (which is the PLU code that actually corresponds to the user selection) is not sent back to the MLM because, according to example embodiments of the disclosed technology, organic item PLU codes are necessarily included among the picklist suggestions. By sending the non-organic PLU code even when the organic equivalent is selected, the accuracy of the model's predictive capacity with respect to the non-organic item is increased, while at the same time ensuring that organic item purchases are properly captured without having to lower the confidence threshold to bring the organic items into the picklist.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

providing, as input to a machine learning model (MLM), one or more images of a produce item captured by one or more cameras associated with a self-checkout transaction terminal;

receiving, as output from the MLM, a set of product lookup (PLU) codes and respective corresponding confidence values, wherein each PLU code corresponds to a candidate item predicted to be the produce item at a likelihood represented by a corresponding confidence value;

processing the set of PLU codes to generate an enhanced picklist of candidate predicted items, wherein the processing comprises inserting into the set of PLU codes a respective organic produce item PLU code for each non-organic produce item PLU code in the set of PLU codes;

presenting a representation of the enhanced picklist on the self-checkout transaction terminal to enable an operator of the self-checkout transaction terminal to select one of the candidate predicted items as the produce item;

receiving input at the self-checkout transaction terminal representing a selection of an organic produce item PLU code from the enhanced picklist;

providing, as feedback data to the MLM, a corresponding non-organic produce item PLU code in lieu of the organic produce item PLU code; and improving an accuracy of the MLM based on the feedback data by increasing a confidence value associated with a non-organic produce item PLU code with respect to the produce item.

2. The method of claim 1, further comprising generating an initial picklist by iterating through the set of PLU codes and discarding any PLU code having a corresponding confidence value that fails to satisfy a confidence threshold, wherein the processing is performed on the initial picklist.

3. The method of claim 2, wherein the processing further comprises discarding any existing organic produce item PLU code in the initial picklist.

4. The method of claim 1, wherein the processing further comprises determining where to insert one or more respective organic produce item PLU codes into the set of PLU codes based on whether a flag is set.

5. The method of claim 4, wherein the processing further comprises inserting each of the one or more respective organic produce item PLU codes immediately before or immediately after a corresponding non-organic produce item PLU code.

6. The method of claim 1, wherein the processing further comprises generating each respective organic produce item inserted into the set of PLU codes by appending a symbol to a corresponding non-organic produce item PLU code.

7. A system, comprising:

one or more servers communicatively coupled to one or more self-checkout transaction terminals, the one or more servers comprising at least one processor and at least one memory storing executable instructions, wherein the at least one processor executes the executable instructions to:

provide, as input to a machine learning model (MLM), one or more images of a produce item captured by one or more cameras associated with a self-checkout transaction terminal;

receive, as output from the MLM, a set of product lookup (PLU) codes and respective corresponding confidence values, wherein each PLU code corresponds to a candidate item predicted to be the produce item at a likelihood represented by a corresponding confidence value;

process the set of PLU codes to generate an enhanced picklist of candidate predicted items, wherein the processing comprises inserting into the set of PLU codes a respective organic produce item PLU code for each non-organic produce item PLU code in the set of PLU codes;

present a representation of the enhanced picklist on the self-checkout transaction terminal to enable an operator of a particular self-checkout transaction terminal to select one of the candidate predicted items as the produce item;

receive input at the self-checkout transaction terminal representing a selection of an organic produce item PLU code from the enhanced picklist;

provide, as feedback data to the MLM, a corresponding non-organic produce item PLU code in lieu of the organic produce item PLU code; and improve an accuracy of the MLM based on the feedback data by increasing a confidence value associated with a non-organic produce item PLU code with respect to the produce item.

8. The system of claim 7, wherein the at least one processor further executes the executable instructions to generate an initial picklist by iterating through the set of PLU codes and discarding any PLU code having a corresponding confidence value that fails to satisfy a confidence threshold, wherein the processing is performed on the initial picklist.

9. The system of claim 8, wherein to process the set of PLU codes the at least one processor further executes the executable instructions to discard any existing organic produce item PLU code in the initial picklist.

10. The system of claim 7, wherein to process the set of PLU codes the at least one processor further executes the executable instructions to determine where to insert one or more respective organic produce item PLU codes into the set of PLU codes based on whether a flag is set.

11. The system of claim 10, wherein to process the set of PLU codes the at least one processor further executes the executable instructions to insert each of the one or more respective organic produce item PLU codes immediately before or immediately after a corresponding non-organic produce item PLU code.

12. The system of claim 7, wherein to process the set of PLU codes the at least one processor further executes the executable instructions to generate each respective organic produce item inserted into the set of PLU codes by appending a symbol to a corresponding non-organic produce item PLU code.

13. A non-transitory computer-readable medium storing executable instructions that when executed by at least one processor cause the at least one processor to perform a method, comprising:

providing, as input to a machine learning model (MLM), one or more images of a produce item captured by one or more cameras associated with a self-checkout transaction terminal;

receiving, as output from the MLM, a set of product lookup (PLU) codes and respective corresponding confidence values, wherein each PLU code corresponds to a candidate item predicted to be the produce item at a likelihood represented by a corresponding confidence value;

processing the set of PLU codes to generate an enhanced picklist of candidate predicted items, wherein the processing comprises inserting into the set of PLU codes a respective organic produce item PLU code for each non-organic produce item PLU code in the set of PLU codes;

presenting a representation of the enhanced picklist on the self-checkout transaction terminal to enable an operator of the self-checkout transaction terminal to select one of the candidate predicted items as the produce item;

receiving input at the self-checkout transaction terminal representing a selection of an organic produce item PLU code from the enhanced picklist;

providing, as feedback data to the MLM, a corresponding non-organic produce item PLU code in lieu of the organic produce item PLU code; and improving an accuracy of the MLM based on the feedback data by increasing a confidence value associated with a non-organic produce item PLU code with respect to the produce item.

14. The non-transitory computer-readable medium of claim 13, the method further comprising generating an initial picklist by iterating through the set of PLU codes and discarding any PLU code having a corresponding confidence value that fails to satisfy a confidence threshold, wherein the processing is performed on the initial picklist, wherein the processing further comprises discarding any existing organic produce item PLU code in the initial picklist.

15. The non-transitory computer-readable medium of claim 13, wherein the processing further comprises determining where to insert one or more respective organic produce item PLU codes into the set of PLU codes based on whether a flag is set.

16. The non-transitory computer-readable medium of claim 15, wherein the processing further comprises inserting each of the one or more respective organic produce item PLU codes immediately before or immediately after a corresponding non-organic produce item PLU code.

17. The non-transitory computer-readable medium of claim 13, wherein the processing further comprises generating each respective organic produce item inserted into the set of PLU codes by appending a symbol to a corresponding non-organic produce item PLU code.

* * * * *